UNITED STATES PATENT OFFICE.

HENRY SOMMER AND ALBERT WEISS, OF MASSILLON, OHIO, ASSIGNORS TO HENRY SOMMER & CO., OF SAME PLACE.

IMPROVEMENT IN THE MANUFACTURE OF YEAST.

Specification forming part of Letters Patent No. 118,495, dated August 29, 1871.

*To all whom it may concern:*

Be it known that we, HENRY SOMMER and ALBERT WEISS, of Massillon, in the county of Stark and State of Ohio, have invented a new and useful Improvement in the Manufacture of Yeast; and we do hereby declare the following to be a clear and exact description of the nature thereof, sufficient to enable others skilled in the art to which our invention appertains to fully understand and use the same.

Our invention relates to an improvement in the manufacture of yeast; and in carrying out the same we proceed as follows:

We take one bushel of barley (coarse-ground) malt, place in a tub and set it with four gallons strong hop-water, 70° to 80° Fahrenheit; let it stand forty minutes; add twelve gallons boiling water; beat it well, and let it stand one hour; strain it, and then place that water in a copper kettle and boil it down to four gallons, adding four pounds of sugar; then take five pounds wheat-flour, five pounds rye-flour, two pounds barley-malt, and scald them with the water as prepared and let stand until cooled off; now add one pint of hop-yeast and let the compound ferment in a cold place. If hop-yeast is not convenient or accessible, brewers', bakers', or other yeast will answer. Secondly, two bushels of malt, coarse ground, are set with twenty gallons of water, 70° Fahrenheit; let it stand forty-five minutes; take twenty gallons of water for each bushel,160° Fahrenheit; mash to a fine paste and let stand one hour; strain the juice as cleanly as possible and then boil it down to three gallons; add two pounds of best hops and three pounds of the best lump-sugar and cool down to 70° to 80° Fahrenheit; pour it into a jug, which must be placed in a spot not colder than 80° Fahrenheit, and allowed to stand until it ferments of itself, and refilled from the same overworked stuff until it stops self-fermentation, after which it is ready for use, and should be kept in a place as cool as possible.

For the working yeast: To each one hundred pounds grain in the yeast use from fifteen to twenty-five gallons of water, and to each one hundred pounds of grain we will use either all malt, or from one-third to two-thirds rye and balance malt, or one-half of each, or other proportions, as desired or necessary. Heat the water from 165° to 195° Fahrenheit, and mix the grain well until no lumps can be seen. After the mixture is made it will be from 140° to 160° Fahrenheit, according to the temperature of the weather. Then we cover it from forty to ninety minutes and let it remain from twelve to thirty hours, cool it down, and use from one to four gallons of cold water to each one hundred pounds. Then take stock-yeast, certain quantities, and introduce it into the working yeast, and in nine to twelve hours it will heat from 9° to 16° Fahrenheit. As soon as the yeast reaches the degree required, we take off stock again and place the stock in a cool place and generally in copper cans.

The yeast as produced is useful for distillers, vinegar-manufacturers, bakers, and all fermentations. By our process the yeast will ferment in from twenty-four to forty-eight hours, and deliver the same yields as other yeasts in seventy-two hours.

Having thus described our invention, what we claim as new, and desire to secure by Letters Patent, is—

The herein-described process of manufacturing yeast.

The above signed by us this 31st day of July, 1871.

HENRY SOMMER.
ALBERT WEISS.

Witnesses:
THOS. BLACKBURN,
MARCUS GOULD.